United States Patent [19]

Lebrun et al.

[11] Patent Number: 5,124,283
[45] Date of Patent: Jun. 23, 1992

[54] HARDENING OF FUSIBLE POLYSILAZANES AND SIC/SI₃N₄ CERAMICS PRODUCED THEREFROM

[75] Inventors: Jean-Jacques Lebrun, Pierre Benite; Charles Bobichon; Olivier Caix, both of Lyons, all of France

[73] Assignee: Rhone-Poulenc Chimie, Courbevoie, France

[21] Appl. No.: 713,594

[22] Filed: Jun. 11, 1991

Related U.S. Application Data

[63] Continuation of Ser. No. 470,302, Jan. 25, 1990, abandoned.

[30] Foreign Application Priority Data

Jan. 30, 1989 [FR] France .................. 89 01115

[51] Int. Cl.⁵ .................. C04B 35/56; C04B 35/58
[52] U.S. Cl. .................. 501/92; 501/88; 501/97; 528/28; 528/32; 525/474; 525/475
[58] Field of Search .................. 501/88, 92, 97, 98; 528/12, 23, 28, 32; 525/474, 475

[56] References Cited

U.S. PATENT DOCUMENTS

| | | | |
|---|---|---|---|
| 3,853,567 | 12/1974 | Verbeek | 106/44 |
| 4,675,424 | 6/1987 | King, III et al. | 556/412 |
| 4,689,382 | 8/1987 | Lebrun et al. | 528/12 |
| 4,693,914 | 9/1987 | Foley | 427/255 |
| 4,861,844 | 8/1989 | Lebrun et al. | 525/475 |
| 4,866,149 | 9/1989 | Lebrun et al. | 526/279 |

*Primary Examiner*—Karl Group
*Assistant Examiner*—Alan Wright
*Attorney, Agent, or Firm*—Burns, Doane, Swecker & Mathis

[57] ABSTRACT

Essentially infusible/insoluble crosslinked polysilazanes, well adapted for pyrolysis and conversion into silicon carbide and/or silicon nitride ceramic materials, are produced by intimately contacting a fusible and organic solvent soluble polysilazane starting material with an effective crosslinking amount of gaseous triflic acid, $CF_3SO_3H$, and in which starting polysilazane the organic radicals directly bonded to silicon atoms are saturated and/or aromatic hydrocarbon radicals and such starting polysilazane being devoid of hydrogen atoms directly bonded to a silicon atom.

14 Claims, No Drawings

HARDENING OF FUSIBLE POLYSILAZANES AND SIC/SI₃N₄ CERAMICS PRODUCED THEREFROM

This application is a continuation of application Ser. No. 07/470,302, filed Jan. 25, 1990 now abandoned.

BACKGROUND OF THE INVENTION

1. Field of the Invention

The present invention relates to the crosslinking of polysilazane polymers and to the use of such crosslinked polysilazanes for the production of ceramic materials based on silicon nitride and/or silicon carbide.

2. Description of the Prior Art

The production of reinforced or unreinforced ceramic materials based on silicon carbide and/or silicon nitride by the thermal decomposition of precursor compounds of the polysilazane type, in particular organopolysilazanes or organopoly(disilyl)silazanes, is known to this art and is widely described in numerous articles and in the patent literature.

The organopolysilazanes and organopoly(disilyl)silazanes, hereinafter designated the polysilazanes, are well known products and exist in the form of monomers, oligomers and cyclic or linear polymers, and also in the form of polymer resins. These polysilazanes may be prepared by a wide variety of processes from a wide range of starting materials.

One advantage of a "polymer" method for the preparation thereof resides in the option of shaping this type of product into fibers or coatings of varying thicknesses, and ultimately producing, after pyrolysis, ceramic articles of Si₃N₄, SiC, SiNC, or mixtures thereof.

Indeed, the ability to shape the polysilazanes into the form of fibers is probably one of their principal advantages.

According to a method which has now become conventional, the polysilazanes (after softening or melting, if originally they are in the solid state) are processed into continuous filaments by any known means, in particular by extrusion through dies, then pyrolyzed to improve their heat resistance and mechanical strength and, ultimately, to provide fibers or filaments of the desired ceramic material The preliminary treatment of the fibers prior to pyrolysis, typically designated hardening, infusibility treatment or crosslinking, constitutes an essential stage in any process for the preparation of ceramic fibers via silazane polymers.

Heretofore, the hardening of polysilazane fibers was carried out either by physical methods (e.g., irradiation) or thermochemical methods.

The principal disadvantages of the physical methods are that they are delicate and expensive and the only method currently being carried out on an industrial level is thermochemical hardening by means of a treatment under a mixture of air and water vapor.

However, such a treatment presents the severe disadvantage of introducing large amounts of oxygen into the ceramic fiber, which may give rise to appreciable changes in the performance of such fibers, in particular relative to thermomechanical properties, such as, for example, their rupture strength.

SUMMARY OF THE INVENTION

Accordingly, a major object of the present invention is the provision of a simple, effective, economical and easily carried out chemical process for the production of essentially infusible polysilazanes in a very wide variety of forms (filaments, fibers, films, molded shaped articles, and the like), which process conspicuously ameliorates those disadvantages and drawbacks to date characterizing the state of this art. Upon pyrolysis of such essentially infusible polysilazanes, ceramic materials based on Si₃N₄ and/or SiC are produced in good yields and which have excellent properties.

Briefly, the present invention features a process for the preparation of essentially infusible polysilazanes by contacting a starting material polysilazane with an effective crosslinking amount of gaseous triflic acid, CF₃SO₃H, and wherein the organic radicals directly bonded to the silicon atoms in said starting polysilazane are saturated and/or are aromatic hydrocarbon radicals and said starting polysilazane is devoid of hydrogen atoms directly bonded to a silicon atom.

DETAILED DESCRIPTION OF THE PREFERRED EMBODIMENTS OF THE INVENTION

More particularly according to the present invention, it has now unexpectedly and surprisingly been determined that polysilazanes can be produced that have a particular structure in terms of their network of crosslinking, which imparts to same good infusibility and insolubility properties.

The starting material organopolysilazanes capable of being crosslinked by the process of the invention are well known products and are readily prepared. For example, at least one organohalogenosilane (a) of the formula (I):

$$R_aX_{4-a}Si \qquad (I)$$

in which X is a halogen, and the radicals R, which may be identical or different, are each a hydrogen atom, a linear or branched chain, optionally halogenated alkyl radical, a cycloalkyl radical, an aryl radical such as a phenyl or naphthyl radical, or an arylalkyl or alkylaryl radical, and a is equal to 0, 1, 2 or 3, is reacted with an organic or organosilyl compound containing at least one NH₂ or NH group, such as for example ammonia, a primary or secondary amine, a silylamine, amide, hydrazine, hydrazide, and the like.

In formula (I), exemplary of the alkyl radicals R are the methyl, ethyl, propyl, butyl, pentyl, hexyl, heptyl and octyl radicals. Exemplary of the cycloalkyl radicals R are the cyclopentyl, cyclohexyl and cycloheptyl radicals. Exemplary arylalkyl radicals R are the benzyl and phenylethyl radicals; and exemplary of the alkylaryl radicals R are the tolyl and xylyl radicals.

Exemplary of the organohalogenosilanes, which may be used either alone or in admixture, the following are representative:

(CH₃)₂SiCl₂, (CH₃)₃SiCl, CH₃SiCl₃, SiCl₄
(CH₃)₂Si(CH₂Cl)₂, (CH₃)₃SiCH₂Cl, CH₃Si(CH₂Cl)₃
(C₆H₅)₂SiCl₂, (C₆H₅)(CH₃)SiCl₂, C₆H₅SiCl₃
(CH₃)(CH₃CH₂)SiCl₂.

Representative compounds containing at least one NH₂ or NH group and suitable for the synthesis of the above organopolysilazanes are ammonia, methylamine, dimethylamine, ethylamine, cyclopropylamine, hydrazine, methylhydrazine, ethylenediamine, tetramethylenediamine, hexamethylenediamine, aniline, methylaniline, diphenylamine, toluidine, guanidine, aminoguanidine, urea, hexamethyldisilazane, diphenyltetramethyldisilazane, tetramethyldivinyldisilazane, dimethyldiphenyldivinyldisilazane, tetramethyldisilazane, and the like.

The organopolysilazanes obtained upon completion of the above reaction more specifically include the following polymers (1), (2) and (3):

(1) linear polymers corresponding to the following formulae:

$$H_2N(R_2SiNH)_p SiR_2NH_2 \qquad (II)$$

and $$R_3SiNH(R_2SiNH)_{p'}SiR_3 \qquad (III)$$

wherein R is as defined for formula (I), and p and p' are integers ranging from 1 to 1,000, preferably from 3 to 300.

The polymers of formula (II) may be prepared by contacting diorganodichlorosilanes with ammonia, and those of formula (III) by reacting ammonia with a triorganochlorosilane (see FR-A 1,086,932 and U.S. Pat. No. 2,564,674).

In general, the reaction of an organohalogenosilane with an organic amine is described in U.S. Pat. Nos. 3,853,567 and 3,892,583 and the reaction of an organohalogenosilane with a disilazane is described in BE-A 888,787.

(2) The cyclic polymers corresponding to the formula:

$$(R_2SiNH)_n \qquad (IV)$$

in which n ranges from 3 to 10 and typically n=3 or 4, and R is as defined for formula (I). The cyclic polymers are particularly described in GB-A 881,178.

(3) The resinous polymers comprising recurring structural units selected from among those of the formulae $R_3SiNH_{0.5}$, $R_2SiNH$, $RSiNH_{1.5}$, $Si(NH)_2$.

These latter polymers are advantageously prepared by contacting the corresponding organochlorosilanes, or mixtures of such silanes, with ammonia, preferably in an organic solvent medium (FR-A 1,379,243, FR-A 1,392,853 and FR-A 1,393,728).

The starting material organopoly(disilyl)silazanes which are crosslinked according to the process of the invention are well known materials and thus are readily prepared. In particular, they may be prepared by reacting an organic or organosilyl compound (a) containing at least one NH₂ or NH group, for example ammonia, a primary or secondary amine, an amide, a hydrazine or a hydrazide, etc., with at least one organohalogenodisilane (b) of the formula:

$$R_bX_{3-b}Si-SiR_cX_{3-c} \qquad (V)$$

wherein the radicals R, which may be identical or different, are as defined above; b is equal to 0, 1, 2 or 3; c is equal to 0, 1 or 2, and X is a halogen, typically chlorine.

The following are exemplary of compounds of the formula (V):
(CH₃)₂ClSiSi(CH₃)₂Cl, (CH₃)₂ClSiSiCH₃Cl₂, CH₃Cl₂SiSiCH₃Cl₂.

Exemplary of the compounds containing at least one NH₂ or NH group and suitable for the synthesis of poly(disilyl)silazanes are those indicated above for the aminolysis of the organohalogenomonosilanes.

In general, the reaction of a halogenodisilane, possibly in the presence of a halogenosilane, with ammonia, is described in EP-A 75,826. The reaction of a halogenodisilane with a disilazane is described in FR-A 2,497,812.

Finally, as described in EP-A 75,826, it is possible to prepare organopoly(disilyl)silazanes-silazanes by reacting the aforenoted amine derivatives with mixtures of halogenated compounds of formulae (I) and (V).

The starting polysilazanes prepared from ammonia are generally designated ammonolysates and the polysilazanes prepared from an amine compound as indicated above are designated aminolysates, which thus include the ammonolysates.

It is also possible to use as the starting polysilazanes, polysilazanes which, after having been prepared by the aminolysis reaction described above, are additionally subjected to well known catalytic treatments in order to initiate, depending on the nature of the aminolysate, polymerization and/or copolymerization and/or a rearrangement of molecules, to further increase their molecular weight, while at the same time retaining their fusibility and solubility in organic solvents.

The conditions for carrying out such catalytic treatments are described, in particular, in the following representative patents: JP-A 77/160,446, U.S. Pat. Nos. 3,007,886 and 3,187,030 and FR-A 2,577,933.

It is also possible to use as the starting polysilazanes, silanes/silazane copolymers prepared by the polycondensation, in a solvent medium and in the presence of an alkali metal, in particular sodium, of chlorinated silanes and chlorinated disilazanes, as described in FR 87/08,091, or polycarbosilazanes produced by thermolysis of the above copolymers, preferably carried out in an inert atmosphere and at a temperature ranging from 250° to 550° C.

Preferably, the starting material polysilazanes contain at least one ≡Si—NH-group per molecule.

Even more preferably, previously prehydrolyzed initial polysilazanes are used. In such event, completely unexpectedly, an even more effective crosslinking is carried out by contacting this polysilazane with triflic acid vapors. In actual practice, the prehydrolysis is advantageously carried out in a manner such that the oxygen content of the polysilazane to be crosslinked then ranges from 1 to 3% by weight. It may be carried out, in particular, by contacting the polysilazane with an atmosphere of water vapor and/or liquid water.

Prior to the crosslinking treatment according to the invention, more fully described hereinbelow, the polysilazanes may be subjected to various forming or shaping operations, making it possible to provide various configurations thereof, such as filaments, fibers, molded shaped articles, coatings of supports, and others. The treatment of the invention may thus advantageously be used for the crosslinking of polysilazane fibers, which, after treatment, are to be pyrolyzed to produce ceramic fibers based on silicon carbide and/or silicone nitride.

It will of course be appreciated that the starting polysilazanes to be crosslinked according to the invention may also contain fillers, preferably selected from among $SiO_2$, $Si_3N_4$, SiC, BN, $B_2O_3$, $B_4C$, AlN, $Al_2O_3$, $Al_4C_3$, TiN, $TiO_2$, $ZrO_2$, ZrC, $VO_2$, etc. Furthermore, if necessary for a given application, their viscosity may be adjusted in conventional manner by the addition of an organic solvent compatible with polysilazanes, such as, for example, benzene, toluene, hexane, cyclohexane, isopropyl ether, ethyl ether, dichloromethane or chlorobenzene.

According to the invention and after optional forming, the aforesaid polysilazanes are treated with triflic acid vapors.

By "effective crosslinking amount" of gaseous triflic acid is intended an amount sufficient to suitably crosslink the polysilazane, thereby assuring its substantially infusible character, i.e., insoluble in most of the usual organic solvents (pentane, hexane, toluene, benzene, and the like).

In practice, amounts of triflic acid ranging from 10 to 10,000 ppm, and more preferably ranging from 1,000 to 10,000 ppm, relative to the starting polysilazane, are advantageously used.

The temperature at which the crosslinking treatment is carried out and its duration may vary over wide ranges and are functions of the nature of the polysilazane to be hardened and the amount of the triflic acid. In general, the duration is a function of the temperature of the treatment: the higher the temperature, the shorter the duration may be, the important fact being that upon completion of the treatment a substantially infusible and insoluble state must be obtained.

In actual practice, the temperature generally ranges from ambient to the softening temperature of the polysilazane to be hardened. It preferably ranges from 70° C. to a temperature slightly lower than the softening temperature of the polysilazane to be hardened, generally 120° C.

The duration of the treatment is not critical; it may range from a few minutes to several hours, as a function of the temperature employed.

The polysilazane/gaseous triflic acid contacting may be effected by any known means.

The gaseous triflic acid may be used either pure of diluted in an inert gas, such as argon (or any other rare gas) or nitrogen, for example.

The process is generally carried out at atmospheric pressure, but lower or higher pressures are also within the ambit of the invention. Furthermore, the contacting of the polysilazane with the gaseous triflic acid may either be static or dynamic, e.g., under a gaseous flowstream. It is preferred to conduct the operation under a flowstream of gas, as this makes it possible to continuously eliminate the ammonia released during the crosslinking reaction.

Upon completion of the crosslinking treatment according to the invention, an infusible polysilazane, optionally formed, that is insoluble in most of the usual organic solvents, in particular in hexane, is recovered.

The compositions hardened in this manner may then be subjected, in a known and conventional manner, to a heat treatment (pyrolysis) to convert them into ceramics based on SiC, $Si_3N_4$ or mixtures thereof.

More particularly, supports coated or impregnated with the hardened polysilazane, or hardened polysilazane fibers, may be immediately or subsequently subjected to a pyrolysis in a vacuum or under pressure or in an inert or reactive atmosphere (for example $NH_3$) until complete conversion into a ceramic material is attained.

In order to further illustrate the present invention and the advantages thereof, the following specific examples are given, it being understood that same are intended only as illustrative and in nowise limitative.

EXAMPLE 1

An initial polysilazane was prepared in the following manner:

Into a double-walled, three liter reactor equipped with means for mechanical agitation, a gas inlet tube and a condenser, in the presence of 1.1 liter of isopropyl ether, a mixture of $CH_3SiCl_3$ (0.85 mole) and $(CH_3)_2SiCl_2$ (0.59 mole) was introduced. This mixture in isopropyl ether was cooled to 3° C. and maintained at this temperature during the introduction of gaseous $NH_3$. The flow rate of the introduction of $NH_3$ was about 6 ml/s and the addition was carried out over 6 hours. Upon completion of the experiment, the ammonium chloride formed was filtered on sintered glass (average pore diameter: 10 μm) and a clear solution of polysilazane was recovered. This solution was then concentrated and treated with triflic acid as described in FR 2,577,933.

Subsequently, the polysilazane in solution was prehydrolyzed by the addition of an amount of water such that the oxygen content of said polysilazane was adjusted to 2.2% by weight.

The solution was then evaporated (elimination of the solvent) and the polysilazane recovered in this manner was then extruded in the form of fibers (mean diameter: 1 μ); the softening temperature Tr of the polysilazane was then 115° C.

These fibers were then treated at 80° C. with a flowstream of argon charged with gaseous triflic acid, the total amount of triflic acid used in the treatment being set at 5,000 ppm relative to the weight of the polysilazane treated.

The fibers treated in this manner were then heated for 16 hours at 100° C.

An infusible product (Tr≧260° C.) was obtained, insoluble in particular in hexane. The oxygen content, determined in the crosslinked fiber, was 3% by weight.

EXAMPLE 2

Polysilazane fibers were prepared as in Example 1, but in this example from a polysilazane produced by the coammonolysis of a mixture of 1.06 mole $CH_3SiCl_3$ and 0.36 mole $(CH_3)_2SiCl_2$; the softening temperature of the polysilazane was then 130° C.

These fibers were then treated at 80° C. with a flowstream of argon charged with gaseous triflic, the total amount of triflic acid used in the treatment being set at 5,000ppm) ppm relative to the weight of the polysilazane treated.

Upon completion of the treatment, an infusible product (Tr≧260° C.) was obtained, insoluble in particular in hexane.

The oxygen content, determined in the crosslinked fiber, was 2.3% by weight.

EXAMPLE 3

The polysilazane fibers produced according to Example 2 were treated at 100° C. with a flowstream of argon charged with gaseous triflic acid, the amount of the triflic acid used again being set at 5,000 ppm.

Upon completion of the treatment, an infusible product (Tr≧260° C.) was obtained, insoluble in particular in hexane.

The oxygen content, determined in the crosslinked fiber, was 2% by weight.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of an essentially infusible/insoluble crosslinked polysilazane, comprising intimately contacting a fusible and organic solvent soluble polysilazane starting material with an effective crosslinking amount of gaseous triflic acid, and in which starting polysilazane the organic radicals directly bonded to silicon atoms are at least one of saturated and aromatic hydrocarbon radicals and said starting polysilazane being devoid of hydrogen atoms directly bonded to a silicon atom.

2. The process as defined by claim 1, said starting polysilazane comprising at least one ≡Si—NH-structural unit per molecule.

3. The process as defined by claim 1, said starting polysilazane comprising an aminolysate.

4. The process as defined by claim 1, said starting polysilazane comprising an ammonolysate.

5. The process as defined by claim 1, said starting polysilazane comprising a silane/silazane copolymer.

6. The process as defined by claim 1, said starting polysilazane comprising a prehydrolyzed polysilazane.

7. The process as defined by claim 6, said prehydrolyzed polysilazane comprising from 1% to 3% by weight of oxygen.

8. The process as defined by claim 1, carried out at a temperature ranging from ambient to the softening temperature of the starting polysilazane.

9. The process as defined by claim 1, comprising shaping said starting polysilazane prior to intimately contacting same with said gaseous triflic acid.

10. The process as defined by claim 9, comprising shaping said starting polysilazane into fibrous form.

11. The process as defined by claim 1, said starting polysilazane comprising a filler material therefor.

12. The process as defined by claim 1, said effective crosslinking amount of gaseous triflic acid comprising from 10 to 10,000 ppm thereof, relative to said starting polysilazane.

13. The process as defined by claim 1, comprising intimately contacting said starting polysilazane with a flowstream containing said gaseous triflic acid and an inert diluent gas.

14. A process for the production of at least one of a silicon carbide or silicon nitride ceramic material, comprising intimately contacting a fusible and organic solvent soluble polysilazane starting material with an effective crosslinking amount of gaseous triflic acid, and in which starting polysilazane the organic radicals directly bonded to silicon atoms are at least one of saturated and aromatic hydrocarbon radicals and said starting polysilazane being devoid of hydrogen atoms directly bonded to a silicon atom, thereby forming an essentially infusible/insoluble crosslinked polysilazane, and thereafter pyrolyzing said crosslinked polysilazane.

* * * * *